ively be amplifiers and the desire signal for the frequencies shown.

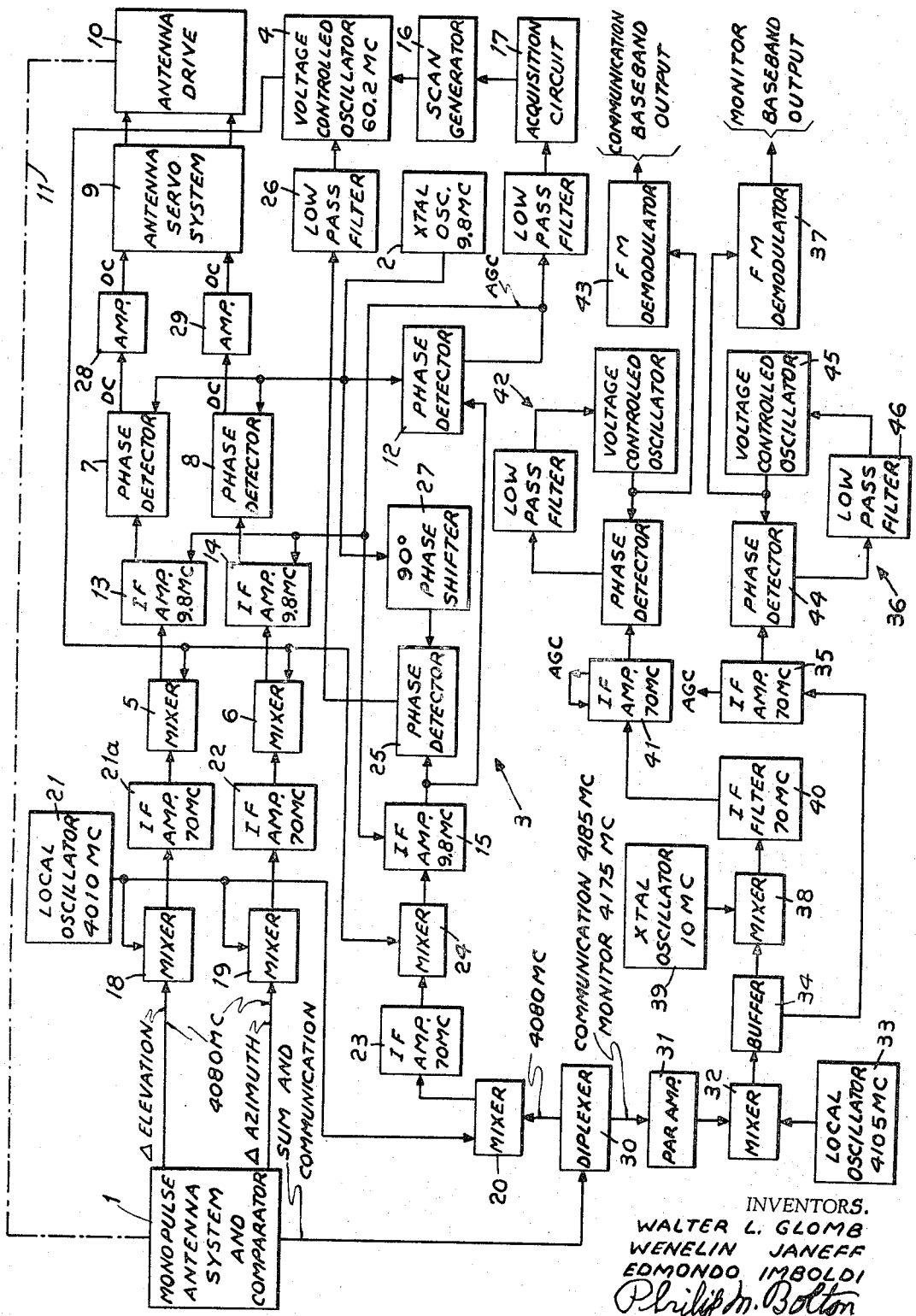

United States Patent Office 3,340,532
Patented Sept. 5, 1967

3,340,532
TRACKING RECEIVER
Walter L. Glomb, Nutley, Wenelin Janeff, Secaucus, and Edmondo Imboldi, Nutley, N.J., granted to the National Aeronautics and Space Administration under the provisions of 42 U.S.C. 2457(d)
Filed Sept. 30, 1963, Ser. No. 312,443
19 Claims. (Cl. 343—113)

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to tracking receivers and more particularly to an improved and simplified tracking receiver of the monopulse type.

An object of this invention is to provide a tracking receiver capable of operating under adverse noise conditions.

Another object of this invention is to provide a receiver suitable for tracking a satellite and for receiving communication therefrom under adverse noise conditions.

Still another object of this invention is to provide a tracking receiver capable of operating under adverse noise conditions employing a minimum amount of equipment.

A feature of this invention is the provision of an antenna system providing at least three signals, such as two difference signals and a reference sum signal, indicating the antenna sighting relative to a target position, a reference oscillator, a phase lock loop including a voltage control oscillator responsive to the output signal of the reference oscillator and one signal of the three signals to establish a phase lock between the output signal of the voltage control oscillator and the one signal, and a heterodyne arrangement to mix the phase locked output signal of the voltage control oscillator with the others of the three signals.

Another feature of this invention is the provision in conjunction with the above-mentioned tracking receiver components of a means, such as a phase detector, coupled to the reference oscillator, responsive to the one signal to produce a gain control signal which then is coupled to control the gain of each of the three signals.

Still another feature of this invention is the provision of an arrangement in conjunction with the above-mentioned components of the tracking receiver to sweep the voltage controlled oscillator until the frequency thereof is capable of being operated upon by the phase lock loop to establish the desired phase lock, the indication of the acquisition of the received signal and phase lock being dictated by the output of the arrangement for producing the gain control signal.

A further feature of this invention is the provision in conjunction with the above-mentioned components of the tracking receiver of coherent detectors responsive to the difference signals and the output of the reference oscillator to provide the antenna control system with control signals to align the antenna sighting with the target position.

Still a further feature of this invention is the provision in cooperation with the above-mentioned components of the tracking receiver of a communication receiver coupled to the sum channel upon which is superimposed a communication signal to enable the recovery of the communication signal under an adverse noise condition utilizing threshold extension techniques of the phase lock loop type.

The above-mentioned and other features and objects of the invention will become more apparent by reference to the following description taken in conjunction with the accompanying drawings, in which: the sole figure is a schematic diagram in block form of a tracking receiver in accordance with the principles of this invention.

Referring to the figure, the basic tracking receiver of this invention includes an antenna system 1 to provide at least three signals indicating the antenna sighting relative to a target position, such as two difference signals and a sum signal, a reference oscillator, such as crystal oscillator 2, and a phase lock loop 3 including a voltage controlled oscillator 4 responsive to the output of oscillator 2 and one of the three signals, such as the sum signal, to lock the output signal of the voltage control oscillator to this one signal and a heterodyning arrangement, such as mixers 5 and 6, to mix the output signal of oscillator 4 with the others of the three signals. In addition to this basic circuit for the tracking receiver, there is provided coherent detection devices, such as phase detectors 7 and 8, coupled to the other signals of the three signals, such as the elevation and azimuth difference signals and the output signal of the crystal oscillator to produce antenna control signals which are coupled to antenna control system, such as antenna servo system 9 and antenna drive system 10 which respond to the control signal to adjust the position of the antenna system 1, such as through mechanical linkage 11.

In addition to these components, the tracking system basically includes an arrangement to produce an AGC (automatic gain control) signal which includes a phase detector 12 responsive to the one or sum signal and the output of oscillator 2 to produce the AGC signal which is coupled to control the gain of all three signals from antenna system 1, such as in IF (intermediate frequency) amplifiers 13, 14, and 15.

Since this is a tracking receiver, the frequency of the voltage control oscillator includes a range of frequencies including a frequency to produce an IF frequency to which the phase lock system responds. To assure that the oscillator frequency is the desired frequency for the necessary phase lock, that is, a frequency to produce the IF frequency, a scanning generator 16 is provided which causes oscillator 4 to sweep through a predetermined frequency range until it is recognized through the AGC control signal that the frequency of oscillator 4 can be locked to the frequency of the sum channel signal at which time the acquisition circuit 17 responds to deactivate the scanning generator 16 to permit the voltage controlled oscillator 4 to come under control of the phase lock loop.

In the following discussion the value of certain frequencies, bandwidths, noise figures, and the like will be given hereinbelow for the purpose of explanation of the specific organization of the tracking receiver of this invention and also to provide an indication of the values and results obtained in a successful reduction to practice of this invention. However, these values are not meant to limit the application of this receiver to these values and results, it being within the skill of one skilled in the art to make the necessary modifications of the circuitry of this receiver to accommodate other frequencies and bandwidths and achieve the same operation in the face of adverse noise conditions.

More specifically, antenna system 1 is a four-horn monopulse system that receives a beacon signal from a target, such as a satellite, and which supplies the appropriate sum and difference outputs required for simultaneous lobe comparison. These three signals derived from antenna system 1 and the comparator included therein are coupled to a first conversion unit including mixers 18, 19 and 20 that reduces the received 4080 megacycle signals to the desired first IF signal of 70 megacycles through means of a common local oscillator 21, crystal-controlled to operate at 4010 megacycles.

The outputs of mixers 18, 19, and 20 are coupled respectively to IF amplifiers 21, 22, and 23 prior to their second conversion in mixers 5, 6, and 24 to a second intermediate frequency of 9.8 megacycles to enable the employment of a 30 kc. (kilocycle) bandpass filter which is incorporated in the intermediate frequency amplifiers 13, 14, and 15. It is obvious to one skilled in the art that this 30 kc. bandpass filter is easier to construct at 9.8 megacycles than at 70 megacycles. The purpose of the 30 kc. filter is to reduce the noise on the 9.8 megacycle signal feeding the phase detectors 7 and 8 and the phase lock loop 3. The conversion to the 9.8 signal from the 70 megacycle signal in the difference channel is accomplished in mixers 5 and 6 which, in effect, is a mixer amplifier. The output of IF amplifiers 21, 22, and 23 is mixed with the output of the voltage controlled oscillator 4 having a signal whose frequency equals 60.2 megacycles and which is controlled by the signal of the sum channel applied through the phase lock loop 3. The 60.2 megacycle signal of oscillator 4 can be amplified in two transistor stages which is performed in mixers 5 and 6 mixed with the 70 megacycle signal in a diode type mixer. The amplification of the output of the oscillator 4 is performed to gain isolation between the voltage controlled oscillator 4 and the mixer and also to raise the 60.2 megacycle signal level to accomplish the switching of the mixer diode. The resultant 9.8 IF signal is fed to amplifier stages 13 and 14 which could be transistorized and tuned to 9.8 megacycles followed by an emitter follower stage. The overall conversion gain in this area is approximately 10 db (decibels).

As previously pointed out, the oscillator 4 supplies its output signal to the difference channel mixers 5 and 6 to derive the signal for coherent detection and, hence, antenna position control. This oscillator 4 is under control of the phase lock loop 3 which responds to the signal of the sum channel; in other words, the signal at the outputs of amplifier 23 and mixer 24. The phase lock loop essentially comprises oscillator 4, phase detector 25, a lowpass filter 26, and a DC (direct current) amplifier, not illustrated. The mixer 24, the 9.8 megacycle amplifier 15, and the 30 kc. crystal filter included therein form part of phase lock loop 3. The purpose of this crystal filter is to improve the predetection signal-to-noise ratio which results in higher acquisition performance under adverse noise conditions.

The bandwidth of the phase detector filter 26 can be selected to be 2 cycles per second (c.p.s.), 1 c.p.s., 0.3 c.p.s., or 0.1 c.p.s. The filter selected determines the loop bandwidth and eliminates most of the noise from the error or output voltage produced in phase detector 25 when compared with the output of oscillator 2 applied through a 90° phase shifted circuit 27. With filter 26 the modulation or control of oscillator 4 is accomplished with a cleaner signal. It will be appreciated that the reference signal of oscillator 2 and the signal applied from amplifier 15 must be in a 90° relationship, thus the purpose of the phase shifter 27. This 90° relationship is necessary to provide a zero control voltage or a null voltage when the signal of oscillator 2 is locked to the output signal of amplifier 15.

The main purpose of the sum channel and phase lock loop 3 is to provide the difference channel with a voltage controlled oscillator signal having low phase jitter. The phase lock loop behaves like a narrow bandpass filter with a variable center frequency. The loop has a choice of four bandwidths, 0.3 kc., 1 kc., 2 kc., and 6 kc., depending on the selection of the lowpass filter. Regardless of the choice of the loop bandwidth, it is much narrower than the bandwidth of the incoming IF signal (2 mc.). This results in a large improvement in the signal-to-noise ratio of the output signal of loop 3, or oscillator 4, namely, 60.2 mc. The sweep voltage of generator 16 and frequency thereof must be selected according to the chosen loop bandwidth. In case the frequency of the incoming signal varies vary slowly, the 300 c.p.s. loop bandwidth which will result in the best signal-to-noise ratio can be selected. Thus, the 0.3 kc. bandwidth can be used most advantageously for slowly-moving targets or satellites. The 6 kc. loop bandwidth must be employed for tracking fast moving targets or satellites. For most present-day satellite use, however, the 2 kc. bandwidth appears to be adequate.

Amplifiers 28 and 29 having selectable bandwidths of 1,000, 100 or 10 c.p.s are employed to bring the signal-to-noise ratio of the error channels up to +10 db at maximum range. In the reduction to practice, oscillator 4 includes a transistor oscillator having a broadly tuned tank circuit in the collector. The tank consisted of a center tapped coil and a variable capacitor having in parallel therewith a varicap diode. The varicap was biased at 10 volts in its most linear characteristic region. This biased voltage was obtained from the phase lock loop, such as the DC amplifier contained in phase detector 25. When an error is developed in the loop at the output of detector 25, the amplified error voltage is applied to the varicap producing a variation in its capacitance and, therefore, a change in the frequency of oscillator 4. In series with the varicap was arranged a fixed capacitor that reduces the frequency variations of the oscillator 4 caused by the varicap. This was necessary to offset variations in the characteristics of the varicap and to minimize the effect of drifts in the DC amplifier output of detector 25 which otherwise would cause large changes in the oscillator frequency, that is, the frequency of oscillator 4. Thus, relatively large voltage variations (as compared to the drift of DC amplifiers) are required to change the frequency of the 60.2 mc. oscillator. This provides a sensitivity for oscillator 4 of 100 kc. per volt. The sensitivity of the oscillator 4 will not, however, remain constant as the bias voltage is changed. This is due to the non-linear characteristic of the varicap and is of no further importance for "in-lock" operation since the loop automatically corrects for the intended frequency variations. The frequency of the oscillator could be adjusted by the variable (linear) capacitor in the tank circuit. Thus, if for any reason the bias of the varicap is changed, the frequency of the oscillator 4 can easily be brought to 60.2 mc. by the adjustment of the capacitor.

The automatic frequency search provided by generator 16 will vary the voltage applied to the varicap between limits determined by the amplitude of the sweep signal applied. The output of generator 16 applied to oscillator 4 was adjusted to sweep the frequency of oscillator 4 over a range of ±100 kc. Therefore, twice for each sweep cycle the oscillator frequency will be of such value that when mixed with the incoming signal in mixer 24 it will produce a signal at the input of detector 25 within the pull-in range of the loop. As soon as phase lock occurs, acquisition circuit 17 is activated and the sweep signal of generator 16 is removed from oscillator 4 which now receives the phase error voltage from the detector 25.

In the reduction to practice of this invention, the sweep generator employed was a simple free-running transistor multivibrator whose frequency could be changed by selecting manually the multivibrator time constants. Four different sweep frequencies could be obtained by this arrangement having periods of 0.25, 0.5, 1.50, and 2.0 seconds. The output of the multivibrator passes through an integrator circuit which produces a triangular waveform. This signal is then passed through a lowpass filter, a potentiometer to control its amplitude, and then to oscillator 4. Thus, the rate and the range of the frequency sweep of oscillator 4 were easily controlled. Circuit 17 could be a controlled bias circuit which when frequency search is in progress permits the sweep to take place. When frequency lock is indicated, the bias is changed to block the sweep operation of generator 16. Other arrangements will be immediately apparent to those skilled in the art.

For instance, circuit 17 could follow generator 16 and behave as an inhibit gate under control of detector 12.

It will be appreciated that the sum channel, in other words the output of amplifier 15, has connected thereto two phase detectors, one detector 25 which is part of the phase lock loop and the other the AGC phase detector 12. The signals that enter the phase detector 12 must be of the same phase, that is, the output of amplifier 15 must have the same phase as the output of oscillator 2 so that maximum output is obtained from phase detector 12. Such an arrangement is, in effect, an IF detector, that is, the DC output of detector 12 is proportional to the input IF level. The DC voltage obtained at the output of detector 12 is fed to the three IF amplifiers 13, 14, and 15. To accomplish this, an AGC amplifier was provided at the output of phase detector 12 (not illustrated) which contained in its collector circuit three potentiometers in parallel, the arm of each potentiometer feeding the AGC voltage to one of the amplifiers 13, 14, and 15. The AGC characteristics of amplifiers 13, 14, and 15 are not always exactly identical and, hence, variations in this AGC characteristic can be compensated for by appropriate setting of the AGC potentiometer. The setting of each individual potentiometer had no effect on the overall gain of the AGC amplifier and no effect on the AGC gain setting of other IF amplifiers. The performance of the AGC amplifier circuitry was such that when the input to all three channels is simultaneously increased by 20 db, the 9.8 mc. IF amplifier outputs do not vary by more than 0.5 db. The larger the gain of the AGC amplifier, the easier it was to meet the above requirement. However, the gain of the AGC amplifier could not be increased indefinitely because of drift conditions in the transistorized amplifiers and because of AGC loop instabilities.

The tracking receiver of this invention may be summarized as follows. The tracking receiver is part of a simultaneous lobe amplitude comparison system. The target position with respect to the antenna boresight axis is contained in the amplitude and phase of the beacon signals received and supplied to the receiver difference channels by the comparison network of system 1. The error signals produced in the difference channels are fed into servo antenna positioning system 9. The magnitude and sign of this error signal is an analog of the instantaneous target position and drives the antenna in such a way as to reduce the error to zero.

Error signals are obtained by coherent detection in detectors 7 and 8. The reference signal for the coherent detection is supplied by a phase lock loop which constitutes the sum channel of the tracking receiver. When locked, the phase lock loop 3 is capable of following the varying frequency of the incoming signal with near zero frequency error.

The receiver performance is determined to a high degree by the performance of phase lock loop 3. High loop gain has been selected which results in a low static phase error (the gain is adjustable within zero and $$3.6 \times 10^6 \text{ rad/sec.})$$

a relatively high natural frequency and relatively low damping factor. As a consequence, the loop noise bandwidth is a minimum. The latter can be selected to suit the signal-to-noise ratio and the dynamic conditions of the received signals. Four discrete positions have been provided in the reduction to practice assuring a noise bandwidth of 6,000, 2,000, 1,000 and 300 c.p.s. A passive, two-time constant integrator network is used in the loop with characteristics that approach those of a perfect proportional plus integral control network. The phase detectors used in the loop and the difference channels are operated with switching voltages of large amplitude. Thus, they exhibit a high degree of linearity under adverse noise conditions. The acquisition threshold of the loop is better than −128 db at a predetection signal-to-noise ratio as low as −6 db with a degradation of 3 db for signal-to-noise ratios of −10 db.

The receiver sum channel provides a signal which is essentially independent of small tracking errors. This signal is used in an automatic gain control loop. The AGC voltage is applied to the sum channel (closed loop) as well as the azimuth and elevation difference channels (open loop). Its purpose is to maintain the signal level applied to the phase lock loop constant and, thus, insure constant loop gain, that is, constant (small) static phase error and constant transient behavior. In addition, the AGC applied to the difference channels makes the obtained error signals independent of target range (within the range of 20 db in the reduction to practice).

The frequency search preceding the acquisition process can be performed at various rates and with various maximum frequency excursions. A sinusoidal voltage of adjustable amplitude is applied to the voltage controlled oscillator. The frequency of this voltage can be selected to be 0.6, 1.0, 1.5 and 2.0 c.p.s. As soon as the input signal frequency is acquired, the AGC phase detector output voltage is used to remove the sweep voltage from the voltage controlled oscillator. If the loop falls out of lock the sweep voltage is automatically reapplied and frequency sweep initiated.

As indicated hereinabove in the objects and features of this application, the tracking receiver of this invention may likewise be utilized as the receiving end of a communication system, such as might be found in a satellite communication system. To this end the receiver signal present in the sum channel is applied to diplexer 30 which is used to separate the communication signal of 4185 mc. and a monitoring signal of 4175 mc. from the reference beacon signal of 4080 mc. The communication and monitoring signals are coupled from the output of diplexer 30 to parametric amplifier 31 having the purpose of providing a receiver noise figure of 2.5 db. The output of parametric amplifier 31 is coupled to a mixer 32 wherein the signal from local oscillator 33 heterodynes the communication and monitor signals to 70 and 80 mc. signals, respectively.

The monitor signal of 70 mc. is coupled from buffer amplifier 34 to the 70 mc. IF amplifier 35 and, hence, through a threshold extension arrangement 36 to a frequency modulation demodulator 37. The communication signal output of buffer amplifier 34 is coupled through mixer 38 and by means of oscillator 39 is converted to an intermediate frequency of 70 mc. for application to the intermediate frequency filter 40 and intermediate frequency amplifier 41. This signal is then applied to a threshold extension arrangement 42 and, hence, to a frequency modulation demodulator 43. Filter 40 provides a bandwidth for the communication receiver of 2 mc. and, hence, will not respond to the monitoring signals, thereby providing isolation in conjunction with buffer amplifier 34 between the monitor receiver and the communication receiver. The monitor receiver is employed to monitor the transmission of the terminal in which the monitor receiver is employed.

The threshold extension arrangements 36 and 40 are substantially identical and, thus, will be described in connection with arrangement 36, it being understood that the same description applies to arrangement 42.

Arrangement 36 is a phase lock type threshold extension circuit and is used to provide a 5 db threshold extension compared to an optimum conventional FM demodulator. The phase detector 44 produces an output which is proportional to the relative phase of the signal of the voltage controlled oscillator 45 and the signal from amplifier 35. The phase detector 44 output varies the voltage controlled oscillator frequency to produce a null at the phase detector output. Under this condition, the signal input from amplifier 35 and the signal output of oscillator 40 are 90° out of phase with each other since the output of phase detector 44 is proportional to the cosine of the relative phase angle between the two inputs thereto. When the input signal, that is, the signal from amplifier 35, is frequency modulated, the voltage controlled oscillator is maintaining its phase relationship to the signal and, hence, will also be frequency modulated. The signal-to-noise ratio at the input to the phase detector, that is, the signal from amplifier 35, is determined by the bandwidth of this amplifier. The noise which modulates the voltage controlled oscillator 45 is proportional to the noise bandwidth of the phase lock loop. Thus, the phase jitter of the oscillator 45 output may be made greater than the IF phase jitter by a factor equal approximately to the effective IF loop filter bandwidth ratio. The design of the phase lock loop is dependent upon the character of the information which it must handle and the usual intermodulation distortion limitations.

The oscillator 45 output is coupled to demodulator 37 for demodulation in a conventional FM demodulator.

While we have described above the principles of our invention in connection with specific apparatus, it is to be clearly understood that this description is made by way of example and not as a limitation to the scope of our invention as set forth in the objects thereof and in the accompanying claims.

We claim:
1. A tracking receiver comprising:
an antenna system providing at least three signals indicating the antenna sighting relative to a target position;
a reference oscillator;
a phase lock loop including a voltage controlled oscillator coupled to said reference oscillator and said antenna system to compare the frequency of the output signal of said reference oscillator and the frequency of one signal of said three signals to lock the frequency of the output signal of said voltage controlled oscillator to the frequency of said one signal of said three signals; and
a heterodyne arrangement to mix said output signal of said voltage controlled oscillator with the others of said three signals.

2. A tracking receiver comprising:
an antenna system providing at least three signals indicating the antenna sighting relative to a target position;
a signal channel coupled to said antenna system for each of said signals;
a reference oscillator;
a phase lock loop including a voltage controlled oscillator coupled to said reference oscillator and one of said channels to compare the frequency of the output signal of said reference oscillator and the frequency of the output signal of said one of said channels to lock the frequency of the output signal of said voltage controlled oscillator to the frequency of the output signal of said one of said channels; and
a mixer disposed in each of the others of said channels coupled to said voltage controlled oscillator.

3. A tracking receiver comprising:
an antenna system providing at least three signals indicating the antenna sighting relative to a target position;
a signal channel coupled to said antenna system for each of said signals;
a mixer included in each of said channels;
a reference oscillator;
a phase lock loop including a voltage controlled oscillator coupled to said reference oscillator and said mixer of one of said channels to compare the frequency of the output signal of said reference oscillator and the frequency of the output of said mixer of said one of said channels to lock the frequency of the output signal of said voltage controlled oscillator to the frequency of the output signal of said mixer of said one of said channels; and
means coupling the output of said voltage controlled oscillator to each of said mixers of the others of said channels.

4. A tracking receiver comprising:
an antenna system providing a plurality of error signals indicating the antenna sighting relative to a target position, and a reference signal;
a reference oscillator;
a phase lock loop including a voltage controlled oscillator coupled to said reference oscillator and said antenna system to compare the frequency of the output signal of said reference oscillator and the frequency of said reference signal to lock the frequency of the output signal of said voltage controlled oscillator to the frequency of said reference signal; and
a heterodyne arrangement to mix said output signal of said voltage controlled oscillator with each of said error signals.

5. A tracking receiver comprising:
a monopulse antenna providing at least three signals indicating the antenna sighting relative to a target position;
a reference oscillator;
a phase lock loop including a voltage controlled oscillator coupled to said reference oscillator and said antenna to compare the frequency of the output signal of said reference oscillator and the frequency of one signal of said three signals to lock the frequency of the output signal of said voltage controlled oscillator to the frequency of said one of said three signals; and
a heterodyne arrangement to mix said output signal of said voltage controlled oscillator with the others of said three signals.

6. A tracking receiver comprising:
a simultaneous lobe comparison antenna system providing a plurality of error signals indicating the antenna sighting relative to a target position, and a reference signal;
a reference oscillator;
a phase lock loop including a voltage controlled oscillator coupled to said reference oscillator and said antenna system to compare the frequency of the output signal of said reference oscillator and the frequency of said reference signal to lock the frequency of the output signal of said voltage controlled oscillator to the frequency of said reference signal; and
a heterodyne arrangement to mix said output signal of said voltage controlled oscillator with each of said error signals.

7. A tracking receiver comprising:
an antenna system providing at least three signals indicating the antenna sighting relative to a target position;
a reference oscillator;
a phase lock loop including a voltage controlled oscillator coupled to said reference oscillator and said antenna system to compare the frequency of the output signal of said reference oscillator and the qrency of one signal of said three signals to lock the frequency of the output signal of said voltage controlled oscillator to the frequency of said one signal of said three signals;
a heterodyne arrangement to mix said output signal of said voltage controlled oscillator with the others of said three signals;
coherent detection device coupled to said heterodyne arrangement and said reference oscillator to produce an antenna control signal; and
an antenna control system coupled to said detection device responsive to said control signal.

8. A tracking receiver comprising:
an antenna system providing at least three signals indicating the antenna sighting relative to a target position;
a reference oscillator;

a phase lock loop including a voltage controlled oscillator responsive to the output signal of said reference oscillator and one signal of said three signals to lock the output signal of said voltage controlled oscillator to said one signal of said three signals;
a heterodyne arrangement to mix said output signal of said voltage controlled oscillator with the others of said three signals;
coherent detection device coupled to said heterodyne arrangement and said reference oscillator to produce an antenna control signal;
an antenna control system coupled to said detection device responsive to said control signal;
means coupled to said reference oscillator and said antenna system responsive to said one signal of said three signals to produce a gain control signal; and
means coupled to said antenna system and said means to produce to control the gain of each of said three signals in response to said gain control signal.

9. A tracking receiver comprising:
an antenna system providing at least three signals indicating the antenna sighting relative to a target position;
a reference oscillator;
a phase lock loop including a voltage controlled oscillator responsive to the output signal of said reference oscillator and one signal of said three signals to lock the output signal of said voltage controlled oscillator to said one signal of said three signals;
a heterodyne arrangement to mix said output signal of said voltage controlled oscillator with the others of said three signals;
means coupled to said reference oscillator and said antenna system responsive to said one signal of said three signals to produce a gain control signal; and
means coupled to said antenna system and said means to produce to control the gain of each of said three signals in response to said gain control signal.

10. A tracking receiver comprising:
an antenna system providing at least three signals indicating the antenna sighting relative to a target position;
a reference oscillator;
a phase lock loop including a voltage controlled oscillator responsive to the output signal of said reference oscillator and one signal of said three signals to lock the output signal of said voltage controlled oscillator to said one signal of said three signals;
a heterodyne arrangement to mix said output signal of said voltage controlled oscillator with the others of said three signals; and
means coupled to said voltage controlled oscillator to sweep said voltage controlled oscillator through a given frequency range until said lock is achieved.

11. A tracking receiver comprising:
an antenna system providing at least three signals indicating the antenna sighting relative to a target position;
a reference oscillator;
a phase lock loop including a voltage controlled oscillator responsive to the output signal of said reference oscillator and one signal of said three signals to lock the output of said voltage controlled oscillator to said one signal of said three signals;
a heterodyne arrangement to mix said output signal of said voltage controlled oscillator with the others of said three signals;
means coupled to said reference oscillator and said antenna system responsive to said one signal of said three signals to produce a gain control signal;
means coupled to said antenna system and said means to produce to control the gain of each of said three signals in response to said gain control signal;
means coupled to said voltage controlled oscillator to sweep said voltage controlled oscillator through a given frequency range; and
means coupled to said means to produce to stop said sweep when said lock is achieved.

12. A tracking receiver comprising:
an antenna system providing at least three signals indicating the antenna sighting relative to a target position;
a reference oscillator;
a phase lock loop including a voltage controlled oscillator responsive to the output signal of said reference oscillator and one signal of said three signals to lock the output signal of said voltage controlled oscillator to said one signal of said three signals;
a heterodyne arrangement to mix said output signal of said voltage controlled oscillator with the others of said three signals;
means coupled to said reference oscillator and said antenna system responsive to said one signal of said three signals to produce a gain control signal;
means coupled to said antenna system and said means to produce to control the gain of each of said three signals in response to said gain control signal;
means coupled to said voltage controlled oscillator to sweep said voltage controlled oscillator through a given frequency range; and
means coupled to said means to produce to stop said sweep when said lock is achieved.

13. A tracking receiver comprising:
an antenna system providing a plurality of error signals indicating the antenna sighting relative to a target position, and a reference signal;
a reference oscillator;
a phase lock loop including a voltage controlled oscillator coupled to said reference oscillator and said antenna system to compare the frequency of the output signal of said reference oscillator and the frequency of said reference signal to lock the frequency of the output signal of said voltage controlled oscillator to the frequency of said reference signal;
a heterodyne arrangement to mix said output signal of said voltage controlled oscillator with each of said error signals;
a coherent detection device coupled to said heterodyne arrangement and said reference oscillator to produce an antenna control signal; and
an antenna control system coupled to said detection device responsive to said control signal.

14. A tracking receiver comprising:
an antenna system providing a plurality of error signals indicating the antenna sighting relative to a target position, and a reference signal;
a reference oscillator;
a phase lock loop including a voltage controlled oscillator responsive to the output signal of said reference oscillator and said reference signal to lock the output signal of said voltage controlled oscillator to said reference signal;
a heterodyne arrangement to mix said output signal of said voltage controlled oscillator with each of said error signals;
a coherent detection device coupled to said heterodyne arrangement and said reference oscillator to produce an antenna control signal;
an antenna control system coupled to said detection device responsive to said control signal;
means coupled to said reference oscillator and said antenna system responsive to said one signal of said three signals to produce a gain control signal; and
means coupled to said antenna system and said means to produce to control the gain of each of said error and reference signals in response to said gain control signal.

15. A tracking receiver comprising:
an antenna system providing a plurality of error signals indicating the antenna sighting relative to a target position, and a reference signal;
a reference oscillator;

a phase lock loop including a voltage controlled oscillator responsive to the output signal of said reference oscillator and said reference signal to lock the output signal of said voltage controlled oscillator to said reference signal;
a heterodyne arrangement to mix said output signal of said voltage controlled oscillator with each of said error signals;
means coupled to said reference oscillator and said antenna system responsive to one of said error and reference signals to produce a gain control signal; and
means coupled to said antenna system and said means to produce to control the gain of each of said error and reference signals in response to said gain control signal.

16. A tracking receiver comprising:
an antenna system providing a plurality of error signals indicating the antenna sighting relative to a target position, and a reference signal;
a reference oscillator;
a phase lock loop including a voltage controlled oscillator responsive to the output signal of said reference oscillator and said reference signal to lock the output signal of said voltage controlled oscillator to said reference signal;
a heterodyne arrangement to mix said output signal of said voltage controlled oscillator with each of sand error signals; and
means coupled to said voltage controlled oscillator to sweep said voltage controlled oscillator through a given frequency range until said lock is achieved.

17. A tracking receiver comprising:
an antenna system providing at least three signals indicating the antenna sighting relative to a target position;
a reference oscillator;
a phase lock loop including a voltage controlled oscillator responsive to the output signal of said reference oscillator and one signal of said three signals to lock the output signal of said voltage controlled oscillator to said one signal of said three signals;
means coupled to said reference oscillator and said antenna system responsive to said one signal of said three signals to produce a gain control signal;
means coupled to said antenna system and said means to produce to control the gain of each of said three signals in response to said gain control signal;
means coupled to said voltage controlled oscillator to sweep said voltage controlled oscillator through a given frequency range; and
means coupled to said means to produce to stop said sweep when said lock is achieved.

18. A tracking receiver comprising:
an antenna system providing a plurality of error signals indicating the antenna sighting relative to a target position, and a reference signal;
a reference oscillator;
a phase lock loop including a voltage controlled oscillator responsive to the output signal of said reference oscillator and said reference signal to lock the output signal of said voltage controlled oscillator to said reference signal;
a heterodyne arrangement to mix said output signal of said voltage controlled oscillator with each of said error signals;
coherent detection device coupled to said heterodyne arrangement and said reference oscillator to produce an antenna control signal;
an antenna control system coupled to said detection device responsive to said control signal;
means coupled to said reference oscillator and said antenna system responsive to said reference signal of said three signals to produce a gain control signal;
means coupled to said antenna system and said means to produce to control the gain of each of said three signals in response to said gain control signal;
means coupled to said voltage controlled oscillator to sweep said voltage controlled oscillator through a given frequency range; and
means coupled to said means to produce to stop said sweep when said lock is achieved.

19. A tracking and communication receiver comprising:
an antenna system providing at least three signals indicating the antenna sighting relative to a target position;
one of said three signals also providing communication signals;
a reference oscillator;
a phase lock loop including a voltage controlled oscillator coupled to said reference oscillator and said antenna system to compare the frequency of the output signal of said reference oscillator and the frequency of said one signal of said three signals to lock the frequency of the output signal of said voltage controlled oscillator to the frequency of said one signal of said three signals;
a heterodyne arrangement to mix said output signal of said voltage controlled oscillator with the others of said three signals; and
communication receiving means coupled to be responsive to said one signal of said three signals to recover said communication signal.

References Cited

UNITED STATES PATENTS

| | | | |
|---|---|---|---|
| 3,136,993 | 6/1964 | Goldbohm. | |
| 3,141,164 | 7/1964 | Holcomb et al. | 343—113 X |
| 3,150,365 | 9/1964 | Wimberly et al. | 343—9 |

RODNEY D. BENNETT, *Primary Examiner.*

CHESTER L. JUSTUS, *Examiner.*

R. E. BERGER, *Assistant Examiner.*